United States Patent
Chen

(10) Patent No.: US 8,268,916 B2
(45) Date of Patent: Sep. 18, 2012

(54) FLAME-RETARDANT COMPOUND AND METHOD OF FORMING A CONTINUOUS MATERIAL THEREFROM

(75) Inventor: Ming-Ming Chen, West Chester, PA (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 553 days.

(21) Appl. No.: 11/859,428

(22) Filed: Sep. 21, 2007

(65) Prior Publication Data

US 2008/0073629 A1     Mar. 27, 2008

Related U.S. Application Data

(60) Provisional application No. 60/826,798, filed on Sep. 25, 2006.

(51) Int. Cl.
 *C08K 5/3477* (2006.01)
(52) U.S. Cl. ....................................................... 524/101
(58) Field of Classification Search ............. 524/99–101
 See application file for complete search history.

(56) References Cited

U.S. PATENT DOCUMENTS

| | | | | |
|---|---|---|---|---|
| 3,607,375 A | * | 9/1971 | Wiejak | 428/327 |
| 3,632,402 A | * | 1/1972 | Weissermel et al. | 428/406 |
| 3,705,859 A | * | 12/1972 | Boylan | 516/115 |
| 3,981,839 A | * | 9/1976 | Asher et al. | 524/457 |
| 4,007,247 A | * | 2/1977 | Ballard et al. | 264/140 |
| 4,180,496 A | | 12/1979 | Yanagimoto et al. | |
| 5,684,071 A | * | 11/1997 | Mogami et al. | 524/100 |
| 6,166,114 A | | 12/2000 | Cosstick et al. | |
| 6,207,735 B1 | * | 3/2001 | Kuma et al. | 524/100 |
| 6,369,137 B2 | * | 4/2002 | Kersjes et al. | 524/100 |
| 2002/0013392 A1 | * | 1/2002 | Matsuda et al. | 524/100 |
| 2003/0022989 A1 | | 1/2003 | Braig et al. | |
| 2003/0073763 A1 | | 4/2003 | Govaerts et al. | |
| 2005/0137297 A1 | | 6/2005 | De Wit | |
| 2005/0154099 A1 | | 7/2005 | Kobayashi et al. | |
| 2005/0234161 A1 | * | 10/2005 | Steib et al. | 524/115 |
| 2006/0217469 A1 | | 9/2006 | Bauer et al. | |
| 2007/0111010 A1 | * | 5/2007 | Kaprinidis | 428/413 |
| 2007/0299171 A1 | * | 12/2007 | Couillens et al. | 524/133 |

FOREIGN PATENT DOCUMENTS

| | | |
|---|---|---|
| JP | 2000178459 A | 6/2000 |
| JP | 2005240035 A | 9/2005 |
| WO | 02057352 | 7/2002 |

* cited by examiner

*Primary Examiner* — Peter Szekely
(74) *Attorney, Agent, or Firm* — Robert Stearns; Dickinson Wright, PLLC

(57) ABSTRACT

A halogen-free flame-retardant compound and method of forming a continuous material therefrom includes compounding poly(ethylene terephthalate) (PET) with fire-retardant ingredients melamine cyanurate (MC) and melamine polyphosphate (MPP). The compound is then formed into pellets and/or extruded as a thin film or sheet, and also as a filament or yarn, including monofilaments and multifilaments.

1 Claim, No Drawings

FLAME-RETARDANT COMPOUND AND METHOD OF FORMING A CONTINUOUS MATERIAL THEREFROM

CROSS-REFERENCE TO RELATED APPLICATION

This application claims the benefit of U.S. Provisional Application Ser. No. 60/826,798, filed Sep. 25, 2006, which is incorporated herein by reference in its entirely.

BACKGROUND OF THE INVENTION

1. Technical Field

This invention relates generally to flame-retardant materials, and more particularly to extruded flame-retardant compounds and to their method of manufacture.

2. Related Art

It is known to manufacture fabrics from flame-retardant yarns, wherein the fabrics are used to protect items from exposure to flame. For example, it is known to construct braided, woven or knitted sleeves from fire-retardant yarns to protect elongate items, such as wires, contained within the sleeves. One known compound ingredient which has desirable fire-retardant properties is melamine cyanurate (MC).

The assignee herein is also the assignee of U.S. Pat. No. 6,828,365, wherein MC is compounded with a fire-retardant polyphosphonate filler and a polymer selected from the group consisting of poly(ethylene terephthalate) and poly(ethylene naphthalate) and then extruded to form a fire-retardant monofilament. Since polyphosphonate is fire-retardant as well, it provides the resulting monofilament with additional fire-retardant properties.

Current commercially available halogen-free flame-retardant poly(ethylene terephthalate) (FR-PET) is made by adding an organo-phosphorous compound in the polycondensation stage of the PET polymerization process, such as in U.S. Pat. No. 4,086,208, which is incorporated herein by reference in its entirety. Unfortunately, the flame-retardant properties of this phosphorus-containing PET (P-FR-PET) do not meet the most stringent flame test requirements. In particular, the burn time and flame spread distance are too long, and it emits flaming drips.

SUMMARY OF THE INVENTION

A halogen-free flame-retardant compound comprises poly(ethylene terephthalate) (PET) and fire-retardant ingredients melamine cyanurate (MC) and melamine polyphosphate (MPP). It is contemplated that an additional stabilizer and processing agent be incorporated in the compound up to about 0.5 weight percent and ⅓ of the combined MC and MPP weight percent, respectively. The compound can be extruded as a thin film or sheet, and also as a filament or yarn, including monofilaments and multifilaments.

Another aspect of the invention includes a method of forming a halogen-free flame-retardant compound for use in an extrusion process. The method comprises: providing ingredients including MC, MPP and PET and introducing the ingredients into a twin screw extruder to form a generally homogenous compound of the ingredients. The compound can then be used in a subsequent or downstream extrusion process to extrude fire-retardant thin film or sheet, or yarn filaments, including monofilaments and multifilaments. In addition to the three ingredients of MC, MPP and PET, it is contemplated that additives including a stabilizer and a processing agent be incorporated during the compounding stage.

In accordance with yet another aspect of the invention, it is contemplated that the method of forming a halogen-free flame-retardant compound for use in an extrusion process can include providing MC, MPP and PET ingredients in fine powder form, and premixing the ingredients prior to their being introduced into a twin screw extruder.

In accordance with yet another aspect of the invention, it is contemplated that the MC, MPP and PET comprise below a 100 ppm combined moisture content.

In accordance with yet another aspect of the invention, it is contemplated that the MC, MPP and PET comprise below a 50 ppm combined moisture content.

Accordingly, a halogen-free flame-retardant compound in accordance with the invention has excellent flame-retardant properties, is economical in manufacture, is useful in forming thin films, sheets and yarns for use in a variety of industries, including, but not limited to, protective clothing, home furnishings, upholsteries, mattresses and beddings, electronics, telecommunications and transportation, and wherein the filament yarns can also be used in the fused deposit modeling process to build parts, for example, and has a long life in use.

DETAILED DESCRIPTION OF PRESENTLY PREFERRED EMBODIMENTS

A halogen-free flame-retardant compound in accordance with one presently preferred embodiment of the invention comprises PET and the fire-retardant (FR) ingredients MC and MPP. The MC can comprise from about 5 to 12 weight percent of the compound, the MPP can comprise from about 5 to 12 weight percent of the compound, and the PET generally comprises the balance of the compound. It is contemplated that an additional stabilizer/antioxidant can comprise up to about 0.5 weight percent of the compound, and further, that the compound can comprise up to about ⅓ of the combined MC and MPP weight percent of a processing agent/chain-extender. The compound can be extruded in a subsequent or downstream extrusion process from the compounding process as a thin film or sheet, and also as a continuous filament or yarn, including monofilaments or multifilaments.

In one presently preferred manufacturing process, the form in which the MC and MPP ingredients are introduced in the compounding stage is controlled. The MC is provided having a particle size of about 2 μm, and the MPP is provided having a particle size of about 5 μm. The size of the MC and MPP particles can vary somewhat, but it is believed that the smaller the particle size, the better the results obtained.

To facilitate dispersion of the MC and MPP fine powder, and to reduce or eliminate possible agglomeration, the MC and MPP fine powders can be premixed with PET powder, with the PET powder being provided in a ratio of about 2 times the combined amounts the MC and MPP fine powders, or more. The particle size of the PET powder is preferably less than 100 μm, and more preferably less than 40 μm. By providing the PET in powder form, it is believed that the MC and MPP have an increased carrier surface area upon which to attach, which in this case, is provided by the exposed surface area of the PET powder.

In addition, the moisture content of the ingredients as they are introduced in compounding stage is preferably controlled. The total or combined moisture content of the MC, MPP and PET is generally controlled to be less than about 100 ppm, and more preferably to be less than about 50 ppm. It is even more preferable to maintain each of the separate ingredients below the respective total moisture content level.

According to another aspect of the invention, a method of forming a halogen-free flame-retardant compound for use in an extrusion process is provided. The method includes providing ingredients of MC, MPP and PET, and then, introducing the ingredients into a twin screw extruder to compound the ingredients into a generally homogenous compound. It is contemplated that the ingredients can be premixed, and then introduced into a hopper at a front end of the twin screw extruder. This provides an enhanced dispersion of the MC and MPP throughout the PET, thereby reducing or eliminating agglomeration. It is also believed that by providing a premix of the MC, MPP and PET, that the screws in the extruder can be provided having a geometry that impart a minimal amount of shear on the ingredients. It is also contemplated that the introduction of the PET could be performed at an initial stage of compounding via a hopper at the front end of the twin screw extruder, while the MC and MPP could be introduced downstream via a side feeder. Further yet, it is contemplated that the ingredients could be introduced at any stage of the compounding stage, as desired.

During compounding, it is believed preferable to maintain the temperature of the ingredients between about 250-260 degrees C. Further, it is believed to be of benefit to utilize a screw configuration that imparts a minimal amount of shear on the polymer chains, while still being able to thoroughly mix all the ingredients to provide a homogenous compound. Upon compounding the ingredients, the compound can then be formed into pellets, for example, for subsequent extruding processes.

The compound pellets can then be used in a subsequent or downstream extrusion process to extrude fire-retardant thin film or sheet, or continuous yarn filaments. The yarn filaments can be formed as either monofilaments or multifilaments, wherein the filaments are ultimately suitable for use in a variety of knitting, weaving or braiding processes, such as to form fabric for use as protective fire-retardant sleeves, for example, or other fire-retardant products, as desired. The filament yarns can also be used in the fused deposit modeling process to build parts, for example.

Obviously, many modifications and variations of the present invention are possible in light of the above teachings. It is, therefore, to be understood that within the scope of the appended claims, and any other claims allowed which are related to this application, that the invention may be practiced otherwise than as specifically described.

What is claimed is:

1. A halogen-free flame-retardant compound, consisting of:
melamine cyanurate ranging between about 5 to 12 weight percent of said compound;
melamine polyphosphate ranging between about 5 to 12 weight percent of said compound;
poly(ethylene terephthalate) ranging between about 76 to 90 weight percent of said compound;
a stabilizer ranging between about 0 to 0.5 weight percent of said compound; and
a processing agent ranging between $\frac{1}{6}$ to $\frac{1}{3}$ weight percent of said melamine cyanurate and said melamine polyphosphate combined.

* * * * *